(12) United States Patent
Le

(10) Patent No.: US 10,478,018 B2
(45) Date of Patent: Nov. 19, 2019

(54) JUICER

(71) Applicant: FOSHAN CITY SHUNDE JUTIAN ELECTRIC APPLIANCE CO., LTD., Foshan, Guangdong (CN)

(72) Inventor: Meiyi Le, Guangdong (CN)

(73) Assignee: FOSHAN CITY SHUNDE JUTIAN ELECTRIC APPLIANCE CO., LTD., Forshan (CN)

( * ) Notice: Subject to any disclaimer, the term of this patent is extended or adjusted under 35 U.S.C. 154(b) by 347 days.

(21) Appl. No.: 15/462,924

(22) Filed: Mar. 20, 2017

(65) Prior Publication Data

US 2018/0184846 A1 Jul. 5, 2018

(30) Foreign Application Priority Data

Dec. 30, 2016 (CN) .................. 2016 2 1482830 U
Feb. 24, 2017 (CN) .................. 2017 2 0180174 U

(51) Int. Cl.
*A23N 1/02* (2006.01)
*A47J 19/00* (2006.01)
*A47J 43/046* (2006.01)
*A47J 19/02* (2006.01)

(52) U.S. Cl.
CPC ............. *A47J 43/046* (2013.01); *A23N 1/02* (2013.01); *A47J 19/00* (2013.01); *A47J 19/027* (2013.01)

(58) Field of Classification Search
CPC ........ A47J 19/027; A47J 19/00; A47J 43/046; A23N 1/02

USPC ............................................ 99/513, 511, 512
See application file for complete search history.

(56) References Cited

U.S. PATENT DOCUMENTS

| 2006/0260478 | A1* | 11/2006 | Hsu ........................ A47J 19/027 99/495 |
| 2012/0227592 | A1* | 9/2012 | Lim ........................ A47J 19/02 99/486 |
| 2014/0053741 | A1* | 2/2014 | Chou ....................... A47J 19/06 99/513 |
| 2014/0130685 | A1* | 5/2014 | Kim ........................ A47J 19/025 99/513 |
| 2014/0331871 | A1* | 11/2014 | Huang .................... A47J 43/0722 99/513 |
| 2016/0021924 | A1* | 1/2016 | Kim ........................ A23N 1/02 99/513 |

FOREIGN PATENT DOCUMENTS

FR 2982472 A1 * 5/2013 ............ A47J 19/025

* cited by examiner

*Primary Examiner* — Reginald Alexander

(57) ABSTRACT

A juicer comprises a base part, a juicer body, a strainer, a threaded cutter and a feed inlet, wherein the strainer is arranged within the juicer body, the juicer body is covered over with the feed inlet and a squeezing chamber is formed between the feed inlet and the strainer, and a buffer chamber is formed between the upper portion of the threaded cutter and the lower portion of the feed inlet; a pivot joint is arranged at the top of the screw body and is pivotally connected to the inner surface of the lower portion of the feed inlet, and the upper portion of the screw body from bottom to top is tapered at first and then broadened to form a radial projecting top. The juicer has increased squeezing efficiency and juice yield, and avoids accumulation of squeezed food.

13 Claims, 4 Drawing Sheets

JUICER

CROSS REFERENCE TO RELATED APPLICATIONS

The present application claims the benefit of Chinese Utility Model Application No. 201621482830.3 filed on Dec. 30, 2016 and Chinese Utility Model Application No. 201720180174.X filed on Feb. 24, 2017. All the above are hereby incorporated by reference.

FIELD OF THE INVENTION

The present invention relates to the field of food processing equipment, more particularly to a juicer.

BACKGROUND OF THE INVENTION

During squeezing by means of existing juicers, when the food is put in too fast, the food residue may be stirred upwards in the feed inlet of the juicer or accumulated at the feed inlet and the threaded cutter as well, which block the feed inlet and the like and obstruct the unsqueezed food from timely entering the squeezing chamber for effective squeezing, thus resulting in poor efficiency of the juicer and also low juice yield of food. Hence, a juicer which meets more processing needs is desired.

SUMMARY OF THE INVENTION

In order to solve the above technical problems, the present invention aims to provide a juicer which has high efficiency and increased juice yield and effectively prevents the squeezed food from accumulating or stirring upwards.

To this end, the present invention provides a juicer, comprising a base part, a juicer body, a strainer, a threaded cutter and a feed inlet, wherein the base part is provided with a drive shaft, the juicer body is arranged on the base part, the strainer is arranged within the juicer body, the juicer body is covered over with the feed inlet and a squeezing chamber is formed between the feed inlet and the strainer, the threaded cutter is installed inside the squeezing chamber and is connected with the drive shaft, the threaded cutter comprises a screw body and a thread line formed on external surface of the screw body, wherein a buffer chamber is formed between the upper portion of the threaded cutter and the lower portion of the feed inlet; a pivot joint is arranged at the top of the screw body and is pivotally connected to the inner surface of the lower portion of the feed inlet, and the upper portion of the screw body from bottom to top is tapered at first and then broadened so as to form a radial projecting top.

Optionally, a protruding part is arranged at the lower portion of the feed inlet, protruding along one side thereof, a buffer chamber is formed between the upper portion of the threaded cutter and the protruding part, and the pivot joint is pivotally connected to the top of the protruding part.

Optionally, the feed inlet is arranged at an angle, and the protruding part is arranged on the side where the feed inlet is tilted to.

Optionally, the protruding part is step-shaped and is broadened from top to bottom.

Optionally, an annular step is arranged at the bottom of the pivot joint.

Optionally, the strainer is cone-shaped and is tapered from top to bottom.

Optionally, a cutter is provided on the inner wall of the upper portion of the feed inlet, and a pluggable push-off arm is further provided within the upper portion of the feed inlet, and a guide groove allowing the cutter to insert from its bottom is arranged on the push-off arm at a position opposite the cutter.

Optionally, the screw body is provided at its lower portion with an inner ring part protruding downwards, a rotation axis is arranged inside the screw body, running through the upper surface and lower surface thereof, and a space which opens downwards is formed between the inner ring and the rotation axis, the top of the rotation axis serves as the pivot joint, and the bottom of the rotation axis is connected with the drive shaft by snap-fitting.

Optionally, the screw body is provided with several thread lines.

Optionally, bulges are formed between the several thread lines.

The present invention has advantages as follows:

In the juicer according to the present invention, the buffer chamber is formed between the upper portion of the threaded cutter and the lower portion of the feed inlet. In a case where the food is pushed into the buffer chamber and is squeezed by the threaded cutter, due to the radial projection formed at the top of the screw body and closely fitted with the inner wall of the lower portion of the feed inlet, an isolation area is formed at the lower portion of the feed inlet, thereby very effectively preventing the food being squeezed from splashing around and blocking the squeezing chamber, and preventing the squeezed food from returning to the feed inlet. In addition, in a case where the threaded cutter keeps rotating, the juicer continues cutting, preserving and squeezing the food in the squeezing chamber, due to the buffer chamber, the processing of the food accumulated at the contact region between the feed inlet and the threaded cutter is facilitated, and the food is continuous squeezed. Thus, the food put in place is continuously squeezed into juice and then the juice flows through filtering holes of the strainer into a juice cup, whereby the efficiency of the juicer and the juice yield of food are both increased.

Figure 1:
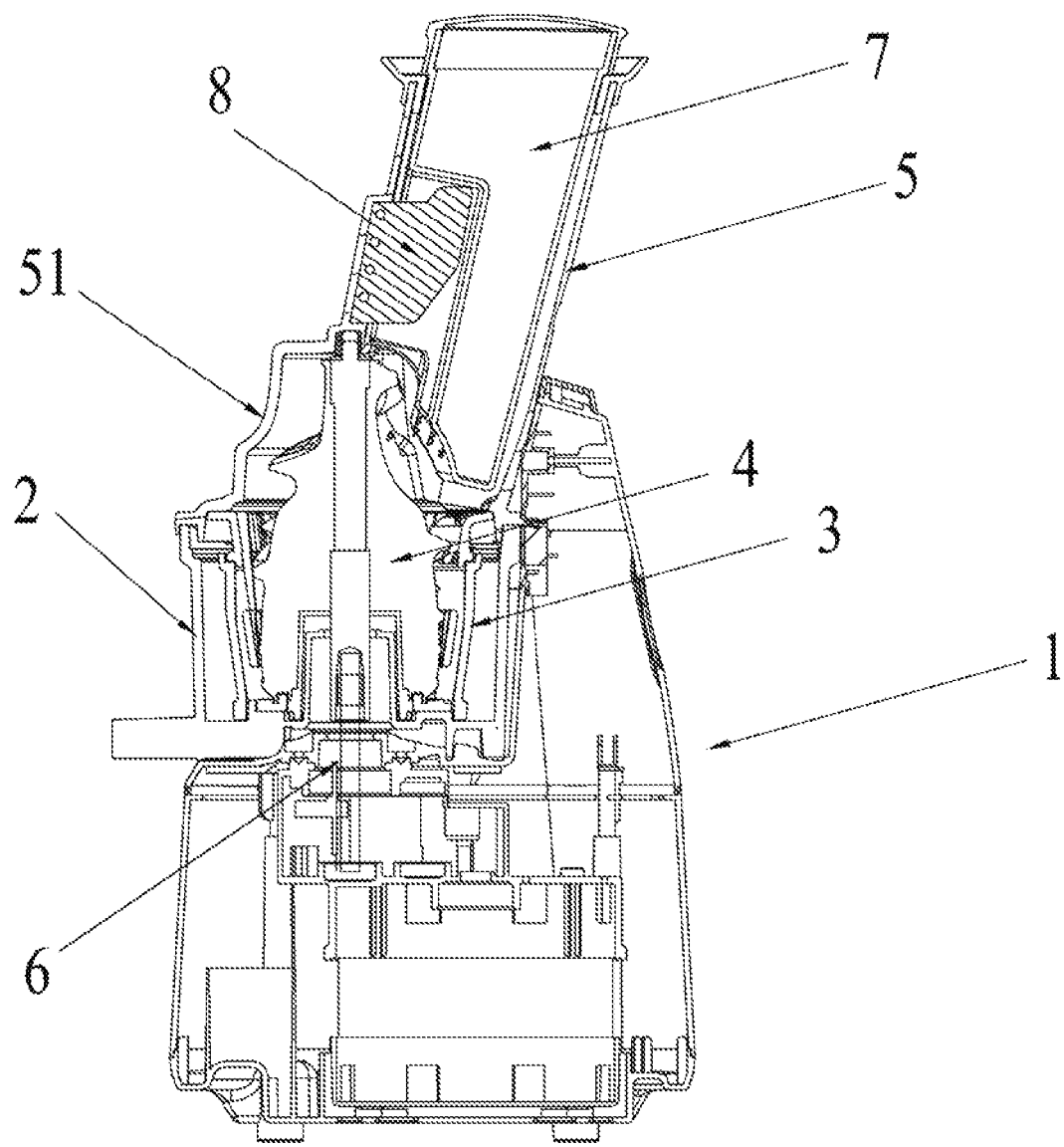
FIG. 1 is a schematic drawing of a juicer according to a preferred embodiment of the present invention.
Figure 2:
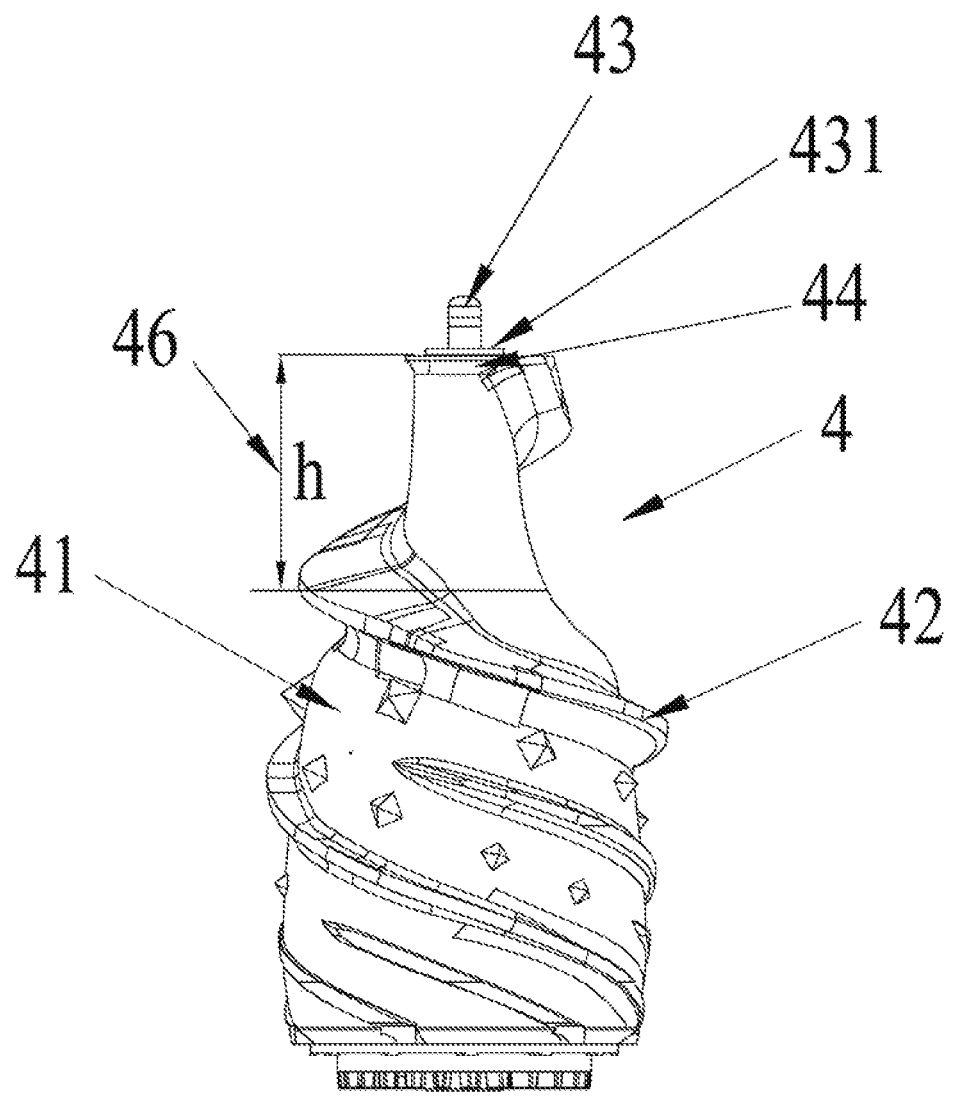
FIG. 2 is a structural drawing of a threaded cutter according to a preferred embodiment of the present invention.

REFERENCE NUMERALS 1. base part; 2. juicer body; 3. strainer; 4. threaded cutter; 41. screw body; 42. thread line; 43. pivot joint; 431. annular step; 44. radial projecting top; 45. rotation axis; 46. upper portion of the screw body; 5. feed inlet; 51. protruding part; 6. drive shaft; 7. push-off arm; 71. guide groove; 8. cutter.

DETAILED DESCRIPTION OF ILLUSTRATED EMBODIMENTS

The present invention will be clearly and completely explained below with reference to figures and particular embodiments. It is evident that, the embodiments described herein are to be regarded as illustrative rather than restrictive. The present invention is intended to cover all changes, various modifications and equivalent arrangements included within the principle and scope of the present invention according to the technical essence of the present invention.

Referring to FIGS. 1-4, a juicer according to a preferred embodiment of the present invention comprises a base part 1, a juicer body 2, a strainer 3, a threaded cutter 4, and a feed inlet 5, wherein the base part 1 is provided with a drive shaft 6, the juicer body 2 is arranged on the base part 1, the strainer 3 is arranged within the juicer body 2, the juicer body 2 is covered over with the feed inlet 5 and a squeezing chamber is formed between the feed inlet 5 and the strainer 3, the threaded cutter 4 is installed inside the squeezing chamber and is connected with the drive shaft 6, the threaded cutter 4 comprises a screw body 41 and thread lines 42 formed on external surface of the screw body 41, and a buffer chamber is formed between the upper portion of the threaded cutter 4 and the lower portion of the feed inlet 5; a pivot joint 43 is arranged at the top of the screw body 41 and is pivotally connected to the inner surface of the lower portion of the feed inlet 5, and the upper portion of the screw body from bottom to top is tapered at first and then broadened to form a radial projecting top 44.

The juicer according to the present invention comprises a buffer chamber formed between the upper portion of the threaded cutter 4 and the lower portion of the feed inlet 5. In a case where the food is pushed into the buffer chamber through the feed inlet 5 and is squeezed by the threaded cutter 4, the squeezed food may splash around and block the feed inlet 5 and the like. At this point, due to the radial projection formed at the top of the screw body 41, the radial projecting top 44 and the inner wall of the lower portion of the feed inlet 5 are closely fitted such that an isolation area is formed at the lower portion of the feed inlet 5, which very effectively prevents the food being squeezed from splashing around and blocking the squeezing chamber, and prevents the squeezed food from returning to the feed inlet. Furthermore, in a case where the threaded cutter 4 keeps rotating, the juicer continues cutting, preserving and squeezing the food in the squeezing chamber, thereby facilitating processing of the food accumulated at the contact region between the feed inlet 5 and the threaded cutter 4, and ensuring continuous squeezing of the food due to the buffer chamber. Thus, the food put in place is continuously squeezed into juice and then the juice flows through filtering holes of the strainer into a juice cup, whereby the efficiency of the juicer and the juice yield of food are both increased.

Furthermore, in the present embodiment, a protruding part 51 is arranged at the lower portion of the feed inlet 5, protruding along one side thereof, the buffer chamber is formed between the upper portion of the threaded cutter 4 and the protruding part 51, and the pivot joint 43 is pivotally connected to the top of the protruding part 51. In this way, the buffer chamber is further optimized, ensuring continuous squeezing of the food. The feed inlet 5 is arranged at an angle, which facilitates control of foods in the feed inlet 5 on one hand, and on the other hand facilitates real-time observation of the buffer chamber through the feed inlet 5. The protruding part 51 is arranged on the side where the feed inlet is tilted to. The protruding part 51 is a step-shaped part broadening from top to bottom, which is mainly fitted with the profile of the threaded cutter 4 to avoid uneven squeezing resulted from an oversized upper part of the buffer chamber.

Figure 3:
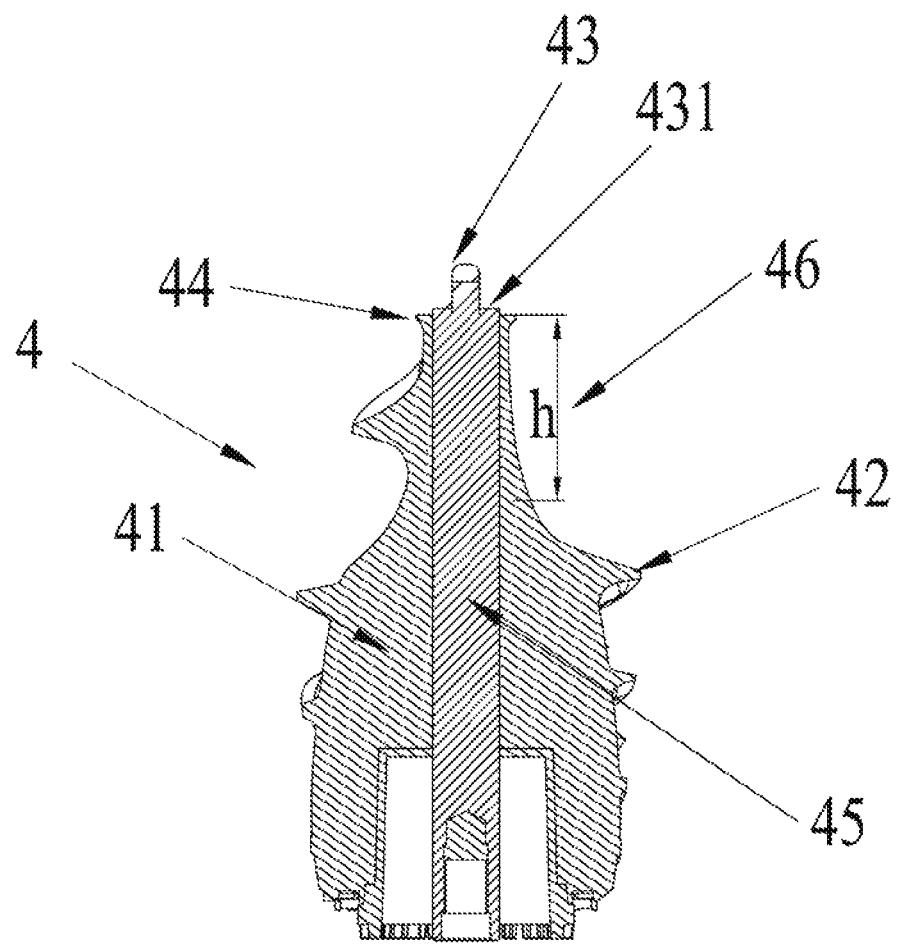
FIG. 3 is a cross-sectional view of a threaded cutter according to a preferred embodiment of the present invention.
Figure 4:
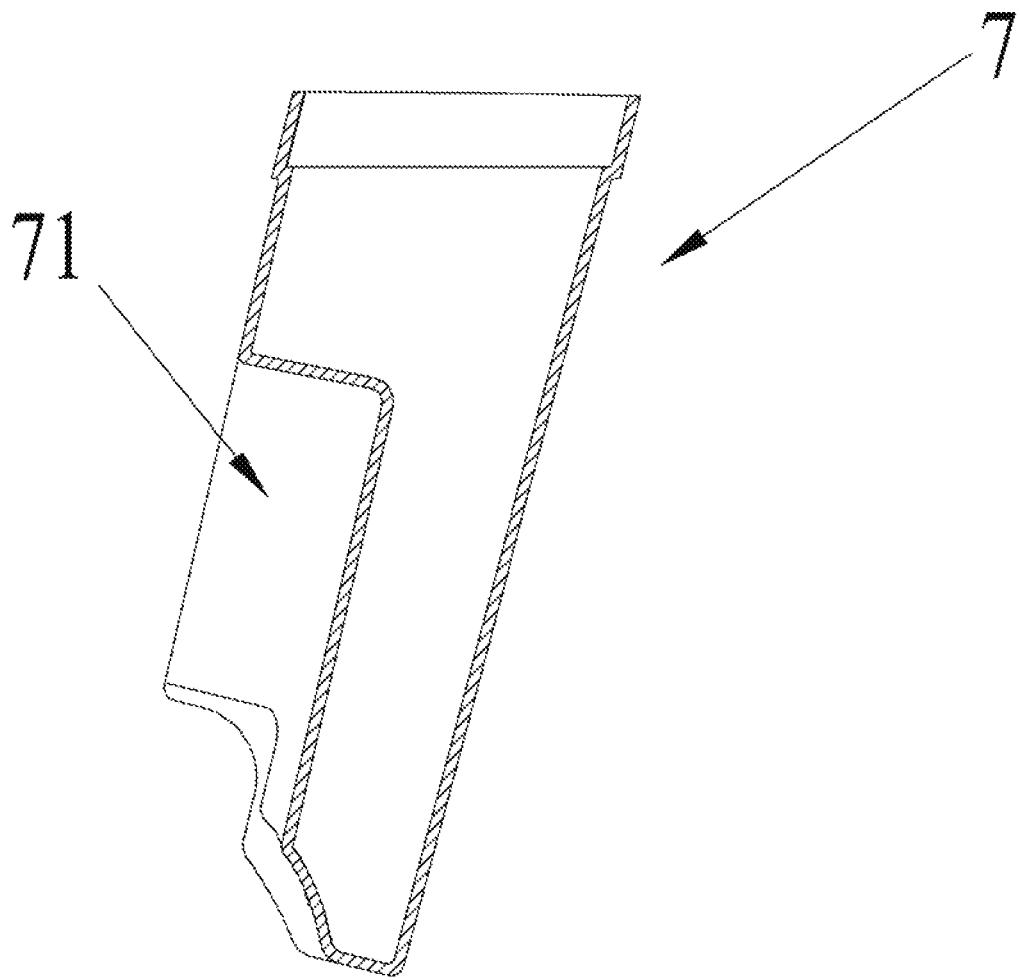
FIG. 4 is a schematic drawing of a push-off arm according to a preferred embodiment of the present invention.

Furthermore, as shown in FIGS. 3-4, an annular step 431 is arranged at the bottom of the pivot joint 43 in the present embodiment, so as to avoid a direct contact between the radial projecting top 44 and the inner surface of the feed inlet 5 and thus reduce wear. Moreover, the strainer 3 is tapered from top to bottom so as to fit the protruding part 51 which is a step-shaped part broadening from top to bottom. Thus, in a case where the bottom of the feed inlet 5 and the top of the strainer 3 are closely fitted, an optimized squeezing chamber which is small at the upper end, big in the middle, and gradually gets smaller from the middle to the bottom is completely formed. Such squeezing chamber effectively cooperates with the threaded cutter 4 to cut, preserve and fully squeeze the food. Furthermore, a cutter 8 is provided on the inner wall of the upper portion of the feed inlet 5, and a pluggable push-off arm 7 is further provided within the upper portion of the feed inlet 5. Since the cutter 8 is pre-mounted in the feed inlet 5, the food can be cut into halves by the cutter 8 when it is pushed into the feed inlet 5 by the push-off arm 7, thereby effectively saving much time, in particular for the bigger food which needs precutting (and thus cleaning of the cutter and cutting board) prior to processing by the juicer. A guide groove 71 allowing for the cutter 8 to insert from its bottom is arranged on the push-off arm 7 at a position opposite the cutter 8, thereby avoiding collision between the push-off arm 7 and the cutter 8 and facilitating the cutting cooperation therebetween.

The screw body 41 is provided at its lower portion with an inner ring part protruding downwards, a rotation axis 45 is arranged within the screw body 41, running through its upper surface and lower surface, and a space which opens downwards is formed between the inner ring and the rotation axis 45. The top of the rotation axis 45 is the pivot joint 43, the bottom of the rotation axis 45 is connected with the drive shaft 6 by snap-fitting, so that the threaded cutter 4 and the drive shaft 6 match each other more closely. There is an interval between the bottom of the push-off arm 7 and the top of the threaded cutter 4, ensuring no contact occurs between the threaded cutter 4 and the push-off arm 7 during operation to hinder the operation of the threaded cutter 4. Bulges are formed between the thread lines 42, wherein the bulges are cone-shaped, triangular pyramid shaped, rectangular pyramid shaped, pentagonal pyramid shaped, or hexagonal pyramid shaped, for increasing squeezing efficiency of the threaded cutter 4. The screw body 41 is provided with several thread lines for further improving the squeezing efficiency of the threaded cutter 4 and the juice yield of food.

Thus, in the juicer according to the present invention, the buffer chamber is formed between the upper portion of the threaded cutter 4 and the lower portion of the feed inlet 5. In a case where the food is pushed into the buffer chamber through the feed inlet 5 and is squeezed by the threaded cutter 4, the squeezed food may splash around and block the feed inlet 5 and the like. At this point, due to the radial projection formed at the top of the screw body 41 and closely fitted with the inner wall of the lower portion of the feed inlet 5, an isolation area is formed at the lower portion of the feed inlet 5, which very effectively prevents the food being squeezed from splashing around and blocking the squeezing chamber, and prevents the squeezed food from returning to the feed inlet. Furthermore, in a case where the threaded cutter 4 keeps rotating, the juicer continues cutting, preserving and squeezing the food in the squeezing chamber, thereby facilitating processing of the food accumulated at the contact region between the feed inlet 5 and the threaded cutter 4, and ensuring continuous squeezing of the food by the buffer chamber. Thus, the food put in place is continuously squeezed into juice and then the juice flows through filtering holes of the strainer into a juice cup, whereby the efficiency of the juicer and the juice yield of food are both increased.

All the above are merely the preferred embodiments of the present invention. It should be understood that, those skilled in the art may change or modify the above disclosed technical contents to obtain equivalent embodiments without departing from the scope of the present invention. The present invention is intended to cover all changes, various modifications and equivalent arrangements included within the principle and scope of the present invention according to the technical essence of the present invention.

What is claimed is:

1. A juicer comprising a base part, a juicer body, a strainer, a threaded cutter and a feed inlet, wherein the base part is provided with a drive shaft, the juicer body is arranged on the base part, the strainer is arranged within the juicer body, the juicer body is covered over with the feed inlet and a squeezing chamber is formed between the feed inlet and the strainer, the threaded cutter is installed inside the squeezing chamber and is connected with the drive shaft, the threaded cutter comprises a screw body and a thread line formed on external surface of the screw body;

the feed inlet is provided at its lower portion with a protruding part which protrudes along one side thereof, a buffer chamber is formed between the upper portion of the threaded cutter and the protruding part, a pivot joint is arranged at the top of the screw body and the pivot joint is pivotally connected to the top of the protruding part, and the upper portion of the screw body from bottom to top is tapered at first and then broadened so as to form a radial projecting top;

wherein a cutter is provided on the inner wall of the upper portion of the feed inlet, a pluggable push-off arm is further provided within the upper portion of the feed inlet, and a guide groove which allows the cutter to be inserted from its bottom is arranged on the push-off arm at a position opposite the cutter.

2. The juicer according to claim 1, wherein the feed inlet is arranged at an angle, and the protruding part is arranged on the side where the feed inlet is tilted to.

3. The juicer according to claim 1, wherein the protruding part is step-shaped and is broadened from top to bottom.

4. The juicer according to claim 1, wherein an annular step is arranged at the bottom of the pivot joint.

5. The juicer according to claim 3, wherein an annular step is arranged at the bottom of the pivot joint.

6. The juicer according to claim 1, wherein the strainer is cone-shaped and is tapered from top to bottom.

7. The juicer according to claim 3, wherein the strainer is cone-shaped and is tapered from top to bottom.

8. The juicer according to claim 3, wherein a cutter is provided on the inner wall of the upper portion of the feed inlet, a pluggable push-off arm is further provided within the upper portion of the feed inlet, and a guide groove which allows the cutter to be inserted from its bottom is arranged on the push-off arm at a position opposite the cutter.

9. The juicer according to claim 1, wherein the screw body is provided at its lower portion with an inner ring part protruding downwards, a rotation axis is arranged within the screw body, running through the upper surface and lower surface thereof, and a space which opens downwards is formed between the inner ring and the rotation axis, the top of the rotation axis serves as the pivot joint, and the bottom of the rotation axis is connected with the drive shaft by snap-fitting.

10. The juicer according to claim 3, wherein the screw body is provided at its lower portion with an inner ring part protruding downwards, a rotation axis is arranged within the screw body, running through the upper surface and lower surface thereof, and a space which opens downwards is formed between the inner ring and the rotation axis, the top of the rotation axis serves as the pivot joint, and the bottom of the rotation axis is connected with the drive shaft by snap-fitting.

11. The juicer according to claim 1, wherein the screw body is provided with thread lines.

12. The juicer according to claim 3, wherein the screw body is provided with thread lines.

13. The juicer according to claim 11, wherein a bulge is formed between the thread lines.

* * * * *